United States Patent
Hwang et al.

(10) Patent No.: US 7,894,409 B2
(45) Date of Patent: Feb. 22, 2011

(54) APPARATUS AND METHOD FOR ESTIMATING AVAILABLE THROUGHPUT IN A WIRELESS LOCAL AREA NETWORK

(75) Inventors: Hyo-Sun Hwang, Seoul (KR); Yong-Xing Zhou, Yongin-si (KR); Dong-Jun Lee, Seoul (KR); Jung-Hoon Suh, Yongin-si (KR); Kyung-Hun Jang, Suwon-si (KR); Young-Soo Kim, Seoul (KR); Junfeng Jiang, Beijing (CN); Pingyi Fan, Beijing (CN); Zhigang Cao, Beijing (CN)

(73) Assignees: Samsung Electronics Co., Ltd. (KR); Tsinghua University (CN)

( * ) Notice: Subject to any disclaimer, the term of this patent is extended or adjusted under 35 U.S.C. 154(b) by 1005 days.

(21) Appl. No.: 11/590,095

(22) Filed: Oct. 31, 2006

(65) Prior Publication Data
US 2007/0147291 A1   Jun. 28, 2007

(30) Foreign Application Priority Data
Dec. 26, 2005   (KR) ..................... 10-2005-0130018

(51) Int. Cl.
*H04W 4/00* (2009.01)
(52) U.S. Cl. ................... 370/338; 370/229; 370/232; 370/235
(58) Field of Classification Search .............. None
See application file for complete search history.

(56) References Cited

U.S. PATENT DOCUMENTS

| | | | |
|---|---|---|---|
| 2004/0100936 A1* | 5/2004 | Liu et al. ................... 370/345 |
| 2004/0202141 A1* | 10/2004 | Sinivaara et al. ............ 370/338 |
| 2005/0265298 A1* | 12/2005 | Adachi et al. ............... 370/338 |
| 2006/0109787 A1* | 5/2006 | Strutt et al. .................. 370/235 |
| 2007/0008922 A1* | 1/2007 | Abhishek et al. ............ 370/329 |
| 2007/0041351 A1* | 2/2007 | Hazra et al. ................. 370/338 |

OTHER PUBLICATIONS

Heusse, Martin et al.; Idle Sense: An Optimal Access Method for High Throughput and Fairness in Rate Diverse Wireless LANs, SIGCOMM '05, Aug. 22-26, 2005; Philadelphia, PA; pp. 121-132.*

* cited by examiner

*Primary Examiner*—Rafael Pérez-Gutiérrez
*Assistant Examiner*—Daniel Nobile
(74) *Attorney, Agent, or Firm*—NSIP Law

(57) ABSTRACT

A method and apparatus for estimating available throughput of a fixed node in a mobile node of a communication network. The communication network includes fixed nodes connected to a router connected to at least one foreign network and mobile nodes connected to the fixed nodes. A second mobile node is selected from among mobile nodes connected to a fixed node whose available throughput is estimated in a first mobile node. An idle slot interval of the second mobile node connected to the fixed node is set. A transmission probability is measured in one slot interval of the second mobile node through an average of set idle slot intervals. Transmission information of the second mobile node is acquired using the measured transmission probability. The available throughput of the fixed node is estimated using the acquired transmission information.

8 Claims, 4 Drawing Sheets

APPARATUS AND METHOD FOR ESTIMATING AVAILABLE THROUGHPUT IN A WIRELESS LOCAL AREA NETWORK

PRIORITY

This application claims priority under 35 U.S.C. §119 to an application entitled "Apparatus and Method for Estimating Available Throughput in a Wireless Local Area Network" filed in the Korean Intellectual Property Office on Dec. 26, 2005 and assigned Serial No. 2005-130018, the contents of which are incorporated herein by reference.

BACKGROUND OF THE INVENTION

1. Field of the Invention

The present invention generally relates to a Wireless Local Area Network (WLAN), and more particularly to an apparatus and method for estimating available throughput in the WLAN.

2. Description of the Related Art

Extensive research is being conducted to provide users with services based on various Qualities of Service (QoS) at a transmission rate of about 100 Mbps, in the fourth-generation (4G) communication systems serving as next-generation communication systems. In the current 4G-communication system, research is actively being conducted to support a high-speed service for ensuring mobility and QoS in Broadband Wireless Access (BWA) communication systems such as Wireless Local Area Network (WLAN) and Metropolitan Area Network (MAN) communication systems.

With the development of communication systems, one of the more flexible data communication systems implemented in an extension or alternative plan of an existing wired LAN is the WLAN. The WLAN employs a wireless medium for transferring data, which is different from the wired LAN employing a wired medium in the existing wired LAN. Using the wireless medium, the WLAN provides a service previously provided by the wired LAN.

FIG. 1 illustrates a conventional wireless communication network.

Referring to FIG. 1, the wireless communication network includes fixed nodes, i.e., Access Points (APs) 110 and 160, and mobile nodes, i.e., terminals 111, 113, and 161, for receiving services from the APs 110 and 160.

The APs 110 and 160 perform a function similar to that of a hub of the existing wired LAN. AP#1 110 has a service area 100 for communicating with a plurality of terminals including terminals 111 and 113. AP#2 150 has a service area 160 for communicating with a plurality of terminals including terminal 161.

Terminal#1 111 receives a service from the AP#1 110. It is assumed that the terminal 113 can receive a service through AP#2 160 as well as AP#1 110.

When network resources for receiving the current service are insufficient or the terminal 113 moves, a resource reservation or handover operation for the terminal 113 may be required. In this case, the terminal 113 estimates available resources of the AP 110 and the neighbor AP 160. The terminal 113 estimates available throughput of the AP.

Two methods are conventionally used to estimate the available throughput of an AP. In the first method, the AP acquires traffic information to be transmitted to each terminal and estimates its throughput. In the first method, the AP broadcasts information about the estimated throughput to its service area in a regular period. When the first method is used, the AP is to collect the traffic information. Because the AP processes data, the AP load increases. There is a problem in that a bandwidth waste occurs since the information about the estimated throughput needs to be periodically broadcast.

In the second method, a terminal estimates throughput of an AP before performing a call setup process relative to the AP. In the method for estimating the throughput in the terminal, a Network Allocation Vector (NAV) is used. The terminal estimates the throughput of the AP from a packet. However, there is a problem in that the throughput cannot be correctly estimated when a packet collision occurs.

To address the above-described problems, a method is needed which can correctly estimate available throughput of an AP in an existing WLAN without degrading system performance.

SUMMARY OF THE INVENTION

It is, therefore, an aspect of the present invention to provide an apparatus and method for estimating available throughput in a Wireless Local Area Network (WLAN).

It is another aspect of the present invention to provide an apparatus and method for correctly estimating available throughput of an access point in a Wireless Local Area Network (WLAN) without degrading system performance.

In accordance with an aspect of the present invention, there is provided a method for estimating available throughput of a fixed node in a mobile node of a communication network having fixed nodes connected to a router connected to at least one foreign network and mobile nodes connected to the fixed nodes, that includes selecting a second mobile node from among mobile nodes connected to a fixed node whose available throughput is estimated in a first mobile node; setting an idle slot interval of the second mobile node connected to the fixed node; measuring a transmission probability in one slot interval of the second mobile node through an average of set idle slot intervals; acquiring transmission information of the second mobile node using the measured transmission probability; and estimating the available throughput of the fixed node using the acquired transmission information.

In accordance with another aspect of the present invention, there is provided an apparatus for estimating available throughput of a fixed node in a mobile node of a communication network having fixed nodes connected to a router connected to at least one foreign network and mobile nodes connected to the fixed nodes, that includes a first mobile node for selecting a second mobile node from among mobile nodes connected to a fixed node whose available throughput is estimated, setting an idle slot interval of the second mobile node connected to the fixed node, measuring a transmission probability in one slot interval of the second mobile node through an average of set idle slot intervals, acquiring transmission information of the second mobile node using the measured transmission probability, and estimating the available throughput of the fixed node using the acquired transmission information.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the following description, detailed descriptions of functions and configurations incorporated herein that are well known to those skilled in the art are omitted for clarity and conciseness.

The present invention estimates available throughput through an Access Point (AP) in a Wireless Local Area Network (WLAN). For the estimation, a terminal communicating with the AP is selected and an idle slot interval of the terminal is set. Using an average of idle slot intervals, a transmission probability is measured in one slot interval. After transmission information of the terminal is acquired, the available throughput of the AP is estimated using the transmission information.

In an example of the present invention, a fixed node is used in the WLAN as an AP and a mobile node is used as a terminal in the WLAN.

Because current communication systems have various communication schemes according to the evolution of existing communication systems, networks using the various communication schemes exist together. Even though the networks employ different communication schemes as a network size is extended, a convergence between networks can be achieved. A wireless communication network including the WLAN will be described with reference to FIG. 2.

Figure 1:
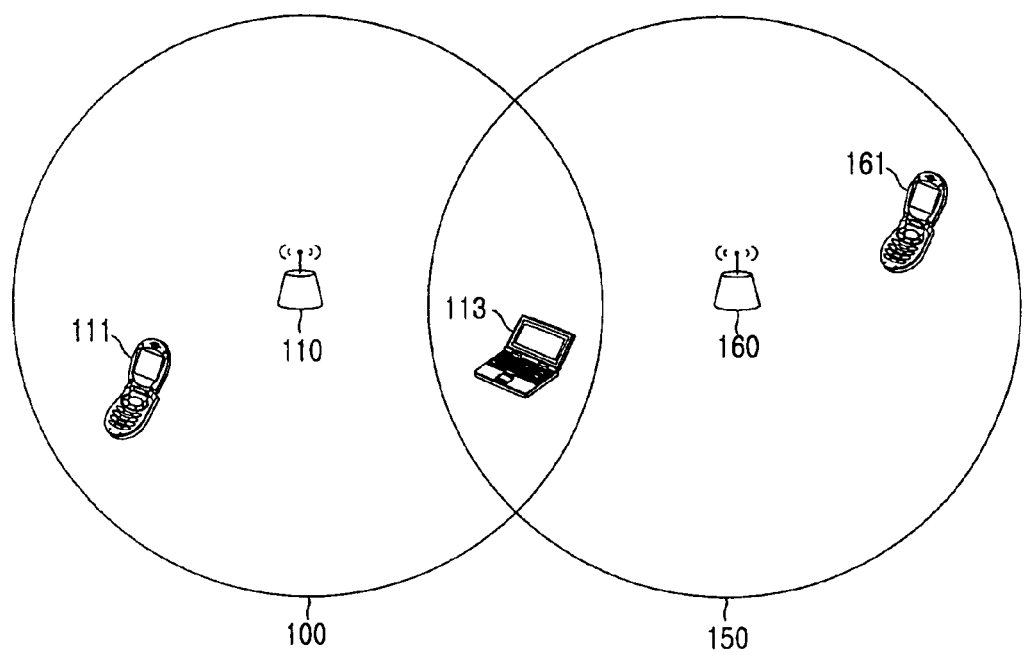
FIG. 1 illustrates a conventional wireless communication network.
Figure 2:
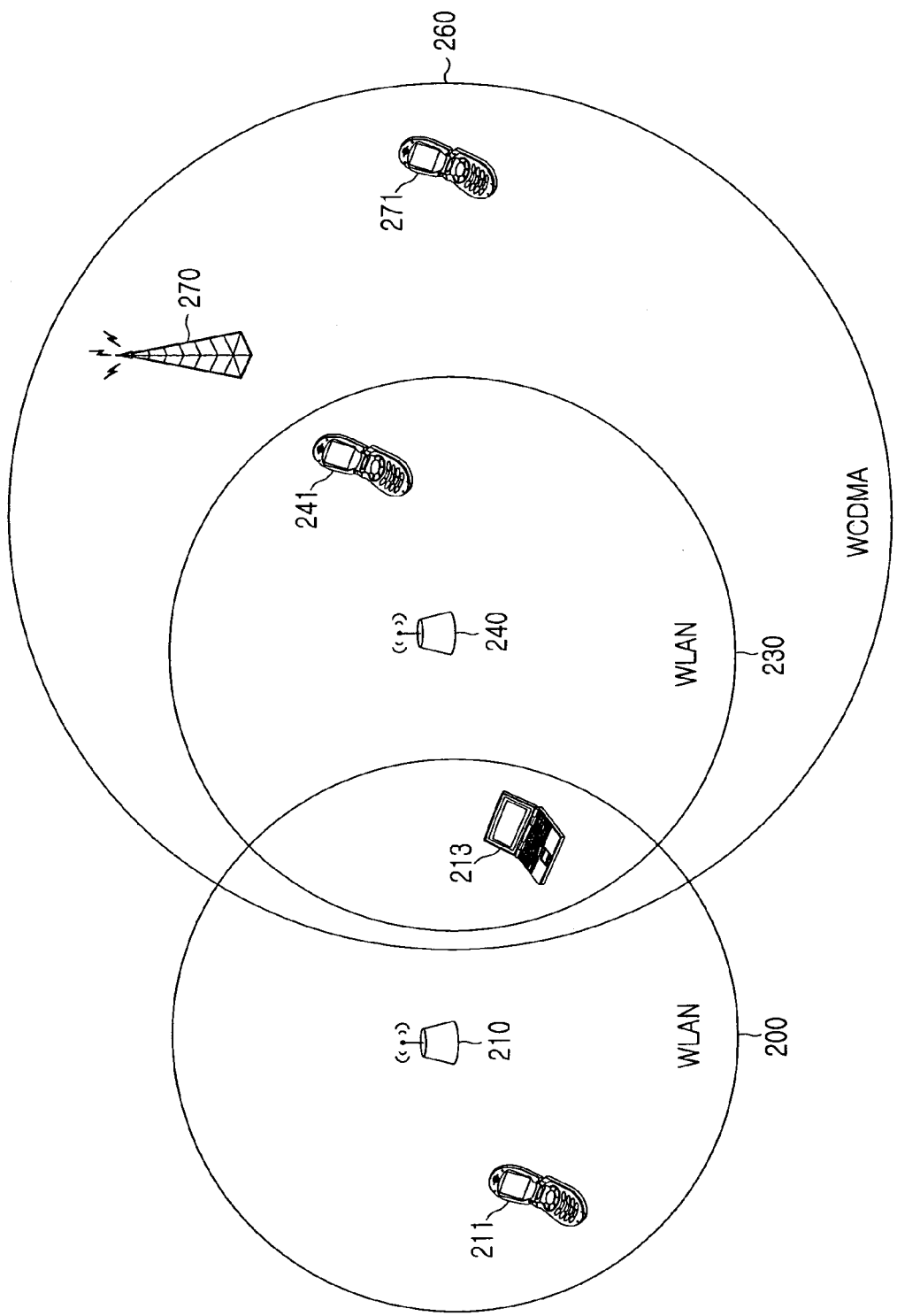
FIG. 2 illustrates a wireless communication network in accordance with the present invention.

FIG. 2 illustrates a wireless communication network in accordance with the present invention.

An example of a WLAN and a Wideband Code Multiple Access (WCDMA) network will be described with reference to FIG. 2 The WLAN includes APs 210 and 240 and terminals 211, 213, and 241 for receiving services from the APs 210 and 240. The WCDMA network includes a base station 270 and a terminal 271 for receiving a service from the base station 270.

The APs 210 and 240 perform a function similar to that of a hub of the existing wired LAN. AP#1 210 has a service area 200 for communicating with a plurality of terminals including the terminals 211 and 213. AP#2 240 has a service area 230 for communicating with a plurality of terminals including the terminal 241. The base station 270 has a service area 260, i.e., a cell, for communicating with a plurality of terminals including the terminal 271. It is assumed that the terminal 213 currently communicates with AP#1 210 and the terminal 271 currently communicates with the base station 270.

The terminal 213 can receive a service through AP#2 240 as well as AP#1 210. The terminal 241 can receive a service through AP# 240 as well as the base station 270. The terminals 211, 213, 241, and 271 are multi-mode stations capable of communicating with networks to which they belong.

For example, the terminals 213 and 241 determine whether network resources are lacking or if a handover is to be performed. When, the network resources are lacking or the handover is to be performed, the terminals 213 and 241 need information about available throughput capable of being provided from an AP of a neighbor network. A method for estimating the available throughput is as follows.

Figure 3:
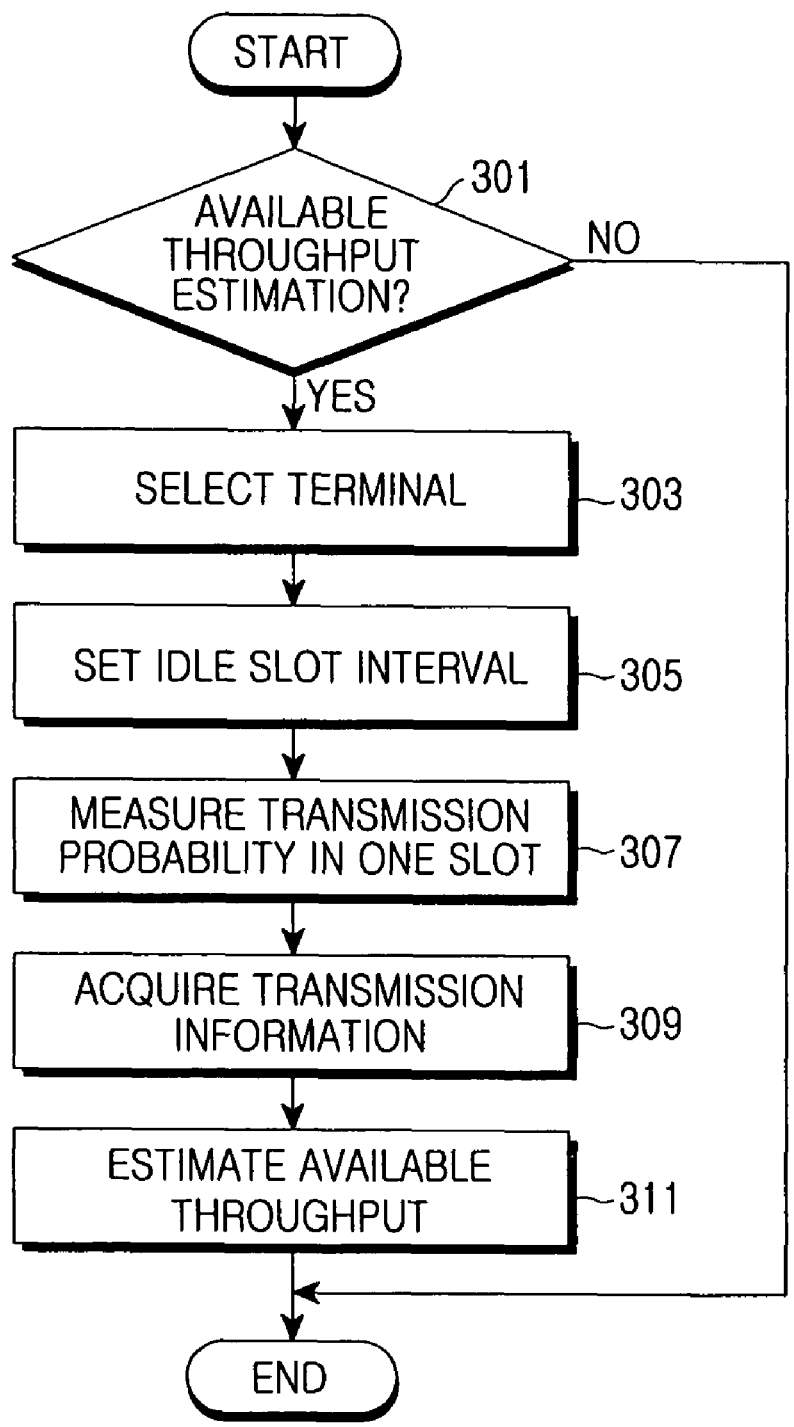
FIG. 3 is a flowchart illustrating an operation for estimating available throughput of an Access Point (AP) in a terminal in accordance with the present invention.

FIG. 3 is a flowchart illustrating an operation for estimating available throughput of an AP in a terminal in accordance with the present invention.

Referring to FIG. 3, a first terminal determines whether to estimate the available throughput of an AP of a neighbor WLAN in step 301. If the available throughput is not to be estimated, the first terminal ends the estimation operation. However, if the available throughput is to be estimated, the first terminal proceeds to step 303. In step 303, the first terminal selects another terminal, i.e., a second terminal, which communicates with an access network where the first terminal desires to estimate the available throughput. Then, the first terminal proceeds to step 305. The first terminal sets an idle slot interval in step 305 and then proceeds to step 307. The first terminal measures a transmission probability in one slot interval in step 307 and then proceeds to step 309. A process for setting the idle slot interval will be described in detail with reference to FIG. 4.

Assuming that the transmission probability in one slot is $P_{tr}$, and an average value of idle slot intervals is $\bar{I}_c$, $P_{tr}$ and $\bar{I}_c$ can be expressed as shown in Equation (1).

$$\bar{I}_c = \sum_{j=0}^{\infty} (j+1)(1-P_{tr})^j P_{tr} = 1 + (1/P_{tr}) \tag{1}$$

On the basis of a relation of Equation (1), $P_{tr}$ can be set using $\bar{I}_c$. Equation (2) can be obtained through Equation (1). The terminal can extract a value of $\bar{I}_c$ by monitoring a channel state. $P_{tr}$ can be computed using Equation (2). Equation (1) is used to verify Equation (2). A definition of the idle interval will be described below.

$$P_{tr}=1/(\bar{I}_c+1) \tag{2}$$

The first terminal acquires transmission information of the second terminal in step 309 and then proceeds to step 311.

At this time, the terminal measures a collision probability $p_c$ relative to other terminals that receives services through an AP for which the first terminal performs the estimation operation in one slot interval, i.e., a slot time. Under saturation condition, $p_c$ is approximated to $P_{tr}$. For example, the terminal can compute a transmission probability τ in an arbitrary slot interval with respect to (n+1) terminals when using the Markov chain expressed in two dimensions. τ is expressed by Equation (3).

$$\tau = \frac{2(1-2P_{tr})}{(1-2P_{tr})(1+W_{min}) + P_{tr}W_{min}(1-(2P_{tr})^m)} \tag{3}$$

In Equation (3), $W_{min}$ denotes a first contention window size, and m denotes the number of terminals. The first terminal computes a probability $P_s$ in which a packet is successfully transmitted in a time of one slot after accessing the WLAN. $P_s$ is expressed in Equation (4).

$$P_s=\tau(1-P_{tr}) \tag{4}$$

The first terminal can compute an average packet length L, and then can compute a successful slot interval $T_S$ and a collision slot interval $T_C$. $T_S$ and $T_C$ are expressed by Equation (5).

$$T_S=L+SIFS+ACK+DIFS+2\delta$$

$$T_C=L+EIFS \tag{5}$$

In Equation (5), $T_S$ is measured by a sum of the packet length L, a short Interframe space (SIFS), an acknowledgement (ACK) message interval, a Distributed Coordination Function (DCF) Interframe Space (DIFS), and an arbitrary constant of 2δ for taking into consideration an error. $T_C$ is measured by the packet length L and an Extended Interframe Space (EIFS).

A transmission probability $T_{idle}$ when the second terminal does not perform any transmission is computed. $T_{idle}$ is expressed by Equation (6).

$$T_{idle} = \left(\frac{1}{\tau} - 1\right)[P_{tr}T_s + (1 - P_{tr})\delta] \quad (6)$$

In step 311, the first terminal estimates available throughput using the transmission information acquired in step 309. The available throughput is expressed by Equation (7).

$$E(S) = \frac{P_s L}{T_{idle} + P_s T_s + (1 - P_s)T_c} \quad (7)$$

Using the available throughput of Equation (7), the first terminal performs a handover decision, a resource reservation, a call admission control, and so on. The above-described method for measuring the available throughput is performed in a Medium Access Control (MAC) layer of the first terminal.

Figure 4:
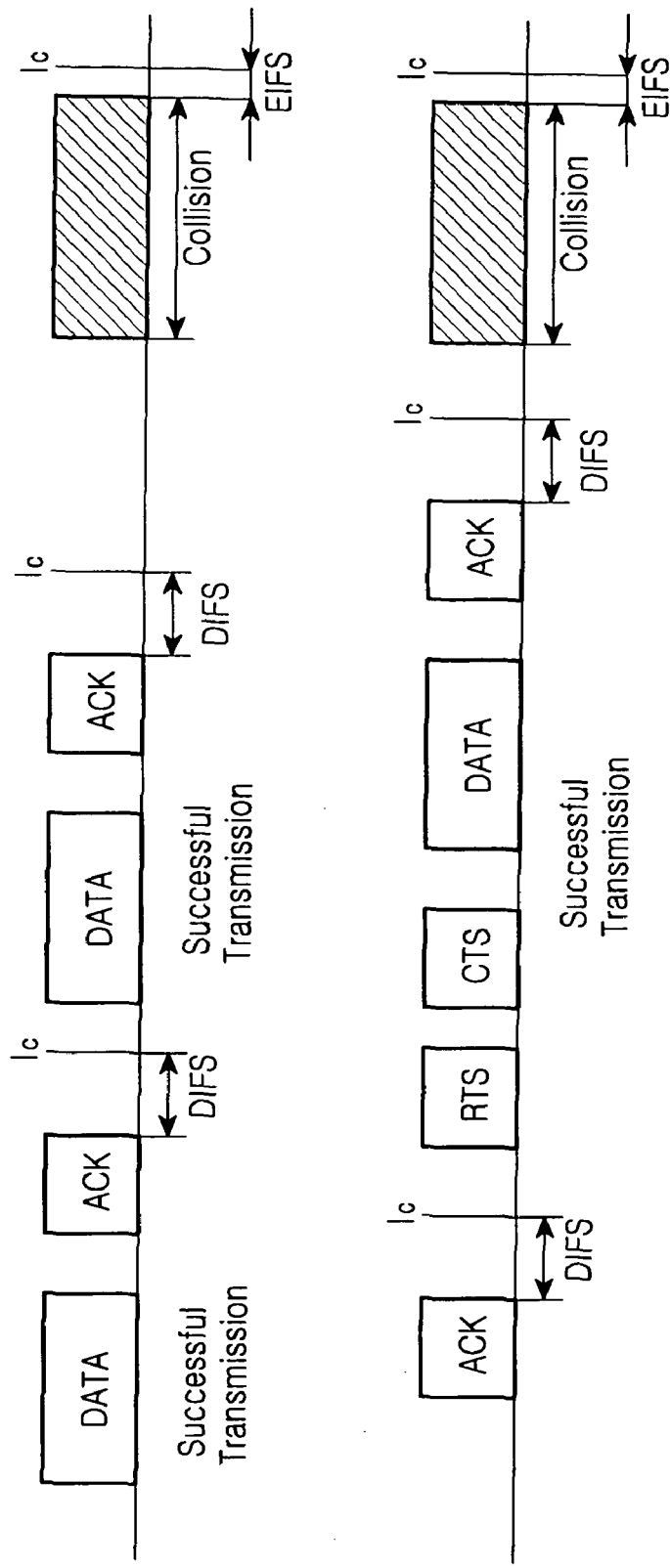
FIG. 4 schematically illustrates a process for setting an idle slot interval in a Wireless Local Area Network (WLAN) in accordance with a the present invention.

FIG. 4 illustrates a process for setting an idle slot interval in the WLAN in accordance with the present invention.

Referring to FIG. 4, the WLAN exploits random access technology for medium access. The random access method requires the technology for avoiding a collision between packets because data is lost due to a collision between packets on a wireless medium and it is difficult for a transmitter to detect a data collision when characteristics of a transmission medium are considered. To avoid the collision between packets, the WLAN exploits Carrier Sense Multiple Access/Collision Avoidance (CSMA/CA) technology. In the CSMA/CA technology, a packet collision and error monitoring is indirectly performed in a basic data transmission process between the transmitter and receiver. When the transmitter does not receive an ACK after transmitting data, it re-transmits the data within a predefined time.

A terminal for receiving data transmitted from only one terminal in a certain time period can correctly receive data through a radio channel. If multiple terminals simultaneously transmit data, the transmitted data may be a signal incapable of being interpreted or broken data.

If any terminal transmits data, it means that a channel is busy. If any terminal does not transmit data, it means that a channel is idle.

When many terminals desire to transmit data, the IEEE 802.11 MAC protocol corresponding to the present invention reduces and adjusts a probability in which data is broken due to simultaneous data transmissions of the terminals. Even though the channel is idle, the terminal transmits data after waiting for a DIFS time and a backoff time (corresponding to a regular random value set in a system) without immediately transmitting the data. When a receiving terminal has received data without error, it transmits the ACK to give notification of the data reception within an SIFS time. If a transmitting terminal has not received the ACK within the SIFS time after transmitting the data, the terminal makes preparation for a data retransmission. When the terminal has received the broken data, the backoff is performed after the EIFS rather than the DIFS until an error-free frame is received.

A basic transmission format is "DIFS-Backoff-Data-SIFS-ACK". To address a problem such as a hidden node in the IEEE 802.11 environment, a Request To Send (RTS) frame is first transmitted before data is transmitted after the backoff and a Clear To Send (CTS) frame can be received in an SIFS interval. When these frames are transmitted, a transmission format can be expressed by "DIFS-Backoff-RTS-SIFS-CTS-SIFS-Data-SIFS-ACK". As described above, a data transmission sequence is set in the SIFS interval. A different terminal cannot intervene between the transmitting terminal and the receiving terminal. However, when the channel is in the idle state for more than the DIFS interval due to error, a different terminal can intervene between the transmitting terminal and the receiving terminal. From FIG. 4, it can be seen that the idle slot starts after the ACK and the DIFS.

As described above, the DIFS, SIFS, and EIFS denote time difference values between frames, where SIFS<DIFS<EIFS.

As is apparent from the above description, the present invention can correctly estimate available throughput without degrading the overall system performance by independently computing the available throughput in a terminal of a WLAN. In accordance with the present invention, a handover decision, a resource reservation, a network selection, a call admission control and so on can be performed using the estimated available throughput.

Although the exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for estimating, by a mobile node, available throughput of a fixed node of a communication network, the communication network having fixed nodes connected to a router, the router connected to at least one foreign network, and mobile nodes connected to the fixed nodes, the method comprising:
    selecting a second mobile node from among mobile nodes connected to a fixed node whose available throughput is estimated in a first mobile node;
    setting an idle slot interval of the second mobile node;
    measuring a transmission probability in one slot interval of the second mobile node through an average of set idle slot intervals;
    acquiring transmission information of the second mobile node according to the measured transmission probability; and
    estimating the available throughput of the fixed node according to the acquired transmission information.

2. The method of claim 1, wherein the idle slot interval comprises an interval in which a data transmission/reception of the second mobile node is successful and a collision interval.

3. The method of claim 1, wherein the estimating of the available throughput is performed in a Medium Access Control (MAC) layer of the first mobile node.

4. The method of claim 1, wherein the transmission information comprises a transmission probability in an arbitrary slot interval, a probability in which a packet is successfully transmitted in slot, a successful slot interval, a collision slot interval, and a packet length.

5. An apparatus for estimating, by a mobile node, available throughput of a fixed node of a communication network, the communication network having fixed nodes connected to a router, the router connected to at least one foreign network, and mobile nodes connected to the fixed nodes, comprising:
 a first mobile node for selecting a second mobile node from among mobile nodes connected to a fixed node whose available throughput is estimated, setting an idle slot interval of the second mobile node, measuring a transmission probability in one slot interval of the second mobile node through an average of set idle slot intervals, acquiring transmission information of the second mobile node according to the measured transmission probability, and estimating the available throughput of the fixed node according to the acquired transmission information.

6. The apparatus of claim 5, wherein the idle slot interval comprises an interval in which a data transmission/reception of the second mobile node is successful and a collision interval.

7. The apparatus of claim 5, wherein the available throughput is estimated in a Medium Access Control (MAC) layer of the first mobile node.

8. The apparatus of claim 5, wherein the transmission information comprises a transmission probability in an arbitrary slot interval, a probability in which a packet is successfully transmitted in a time of one slot, a successful slot interval, a collision slot interval, and a packet length.

* * * * *